Patented Jan. 31, 1939

2,145,266

UNITED STATES PATENT OFFICE 2,145,266

TREATING TOBACCO

Frank A. Knox, St. Louis, Mo., assignor to The Guardite Corporation, a corporation of Illinois No Drawing. Application November 18, 1937, Serial No. 175,329

5 Claims. (Cl. 131—55)

This invention relates to a method of treating tobacco, and more particularly to a method of treating tobacco loosely encased in wooden hogsheads.

The Merriam and Wiles Patent No. 2,080,179 describes the method of moistening organic products in bulk in which the products are subjected to a high vacuum at atmospheric temperature to cause boiling of contained moisture, and are then subjected to steam. The Otterbein A. Bailey application Ser. No. 161,109, filed August 26, 1937, further discloses an improvement on this process in which tobacco in hogsheads is treated by the Merriam and Wiles method but is subjected to a water spraying step while under high vacuum.

In both of these processes there is a tendency of the outer leaves of tobacco to dry off when exposed to the atmosphere, leaving a few leaves which are more brittle than the remainder of the hogshead.

It has now been discovered that this difficulty may be overcome by preliminarily wetting the wooden casing of the hogshead with liquid water, preferably cold, and then subjecting the hogshead to the ensuing treatment either by the Merriam and Wiles process alone or including the spray step. The improvement takes place regardless of which method is followed.

As an example of the process, a hogshead of Burley tobacco weighing 1185 pounds, including the weight of the wooden casing, was sprayed on the outside with an ordinary garden spray to thoroughly wet the wood. No effort need be made to avoid wetting tobacco through the cracks. The amount of water should be enough to produce a film over the hogshead. Ordinarily from two to four gallons is sufficient although the amount which remains upon the wood is somewhat less, of course.

The wetted hogshead was then placed in a closed chamber and subjected to a vacuum sufficiently high to cause a drop in temperature in the tobacco from 77° to 74°, whereupon steam was introduced to increase the temperature to 164°. During this steaming operation six gallons of water was introduced during the first three minutes of the steaming, the entire steaming operation taking fifteen minutes. The steam employed was saturated steam.

The chamber was then evacuated until the temperature had dropped to 140°, was steamed again to 165°, evacuated to produce a temperature of 145°, and finally steamed to 156°. 62 lbs. of water was added to the container, or 5.23%. The outer tobacco was in fine condition.

In a similar operation another hogshead of Burley tobacco weighing 1156 lbs. was sprayed with water to produce a film on the casing, was placed in a tank and subjected to a vacuum until the temperature had dropped from 84° to 78° and then was steamed, 8 gallons of water being sprayed with the steam in the first four minutes of the steaming period. The total time of steaming was 14 minutes and the highest temperature 164°. The tobacco was then successively cooled to 138°, heated to 165°, cooled to 141°, and then steamed to 156°. 67 lbs. of water was added to the tobacco.

In the last two instances a fine mist of spray was employed. In another instance in which a $\frac{1}{16}$ inch opening was used for introduction of spray in the chamber, the hogshead was preliminarily sprayed, subjected to a vacuum sufficiently high to cause a drop in temperature, was then sprayed with 6 gallons of water through the $\frac{1}{16}$ inch opening, the total spraying time taking about one minute, after which steam was employed for another eleven minutes to raise the temperature to 164°. In this instance the weight of the hogshead increased from 1224 lbs. to 1309 lbs.

The process is also applicable to the treatment of tobacco in hogsheads or in compactly packed bulk, where no surrounding casing is employed. Not so much water adheres to the dry tobacco as to the wood, but its condition is improved.

The foregoing detailed description has been given for clearness only, and no unnecessary limitations should be understood therefrom, but the appended claims should be construed as broadly as permissible in view of the prior art.

I claim:

1. The method of treating tobacco containing substantial percentages of moisture in hogsheads which comprises preliminarily wetting the casing of the hogshead with water, subjecting the wetted hogshead in a closed container to a high vacuum wherein water on the casing is boiled, and steaming the hogshead substantially to raise the moisture content thereof, and then admitting air to the container.

2. The method of treating tobacco containing substantial percentages of moisture encased in wooden hogsheads which comprises preliminarily wetting the wooden casing of the hogshead with liquid water, subjecting the wetted hogshead in a closed container to a high vacuum sufficiently high to boil water thereon, and maintaining the vacuum until water has boiled from the tobacco sufficiently to reduce the temperature thereof, and then steaming the hogsheads while in the closed container substantially to increase the moisture content thereof.

3. The method as set forth in claim 2, in which liquid water is sprayed into the closed container immediately following the evacuation step.

4. The method as set forth in claim 2, in which the steaming operation is carried out under a vacuum.

5. The method of treating tobacco containing substantial percentages of moisture in a tightly packed mass which comprises wetting the mass exteriorly, then subjecting it to a vacuum to cause boiling of water, steaming the evacuated mass, and then admitting air thereto.

FRANK A. KNOX.